United States Patent
Park et al.

(10) Patent No.: US 8,861,182 B2
(45) Date of Patent: Oct. 14, 2014

(54) CONDUCTIVE PASTE COMPOSITION FOR INTERNAL ELECTRODE, MULTILAYER CERAMIC CAPACITOR, AND FABRICATION METHOD THEREOF

(75) Inventors: Ye Jun Park, Gyunggi-do (KR); Yoon Hee Lee, Gyunggi-do (KR); Dong Hoon Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/590,831

(22) Filed: Aug. 21, 2012

(65) Prior Publication Data

US 2013/0321979 A1  Dec. 5, 2013

(30) Foreign Application Priority Data

Jun. 4, 2012 (KR) .......................... 10-2012-0059762

(51) Int. Cl.
*H01G 4/06* (2006.01)

(52) U.S. Cl.
USPC .................. 361/321.4; 361/321.1; 361/321.2; 361/321.5; 361/306.1; 361/306.3

(58) Field of Classification Search
USPC ................ 361/321.1, 311–313, 321.2, 321.4, 361/321.5, 306.1, 306.3
See application file for complete search history.

(56) References Cited

U.S. PATENT DOCUMENTS

| 2004/0013556 A1 | 1/2004 | Silvain et al. |
| 2006/0171099 A1 | 8/2006 | Barber et al. |
| 2007/0125195 A1 | 6/2007 | Akimoto et al. |
| 2013/0038983 A1* | 2/2013 | Kim et al. .................. 361/321.1 |

FOREIGN PATENT DOCUMENTS

| JP | 64-80010 A | 3/1989 |
| JP | 10-106351 A | 4/1998 |
| JP | 2005-129328 A | 5/2005 |
| JP | 2009-024204 A | 2/2009 |
| JP | 2011-199252 A | 10/2011 |
| KR | 2003-0069179 A | 8/2003 |

OTHER PUBLICATIONS

Korean Office Action issued in corresponding Korean Application No. 10-2012-0059762, dated May 29, 2014, with English translation.
Office Action issued on May 7, 2014 in the corresponding Japanese Patent Application No. 2012-182129.

* cited by examiner

*Primary Examiner* — Nguyen T Ha
(74) *Attorney, Agent, or Firm* — McDermott Will & Emery LLP

(57) ABSTRACT

There are provided a conductive paste composition for an internal electrode, a multilayer ceramic capacitor having the same, and a fabrication method thereof. The conductive paste composition for an internal electrode includes a binder, a solvent, and metal powder for an internal electrode, including a nickel particle coated with a nickel nitride.

11 Claims, 3 Drawing Sheets

A-A'

A-A'

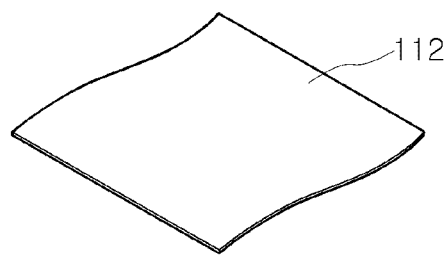
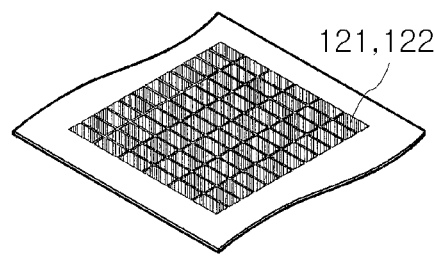
FIG. 4A　　　　　　　　FIG. 4B
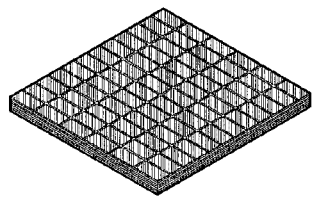
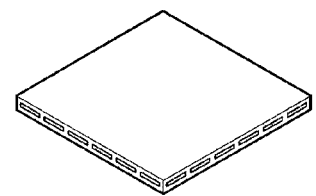
FIG. 4C　　　　　　　　FIG. 4D
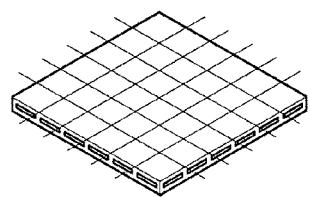
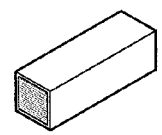
FIG. 4E　　　　　　　　FIG. 4F

CONDUCTIVE PASTE COMPOSITION FOR INTERNAL ELECTRODE, MULTILAYER CERAMIC CAPACITOR, AND FABRICATION METHOD THEREOF

CROSS-REFERENCE TO RELATED APPLICATIONS

This application claims the priority of Korean Patent Application No. 10-2012-0059762 filed on Jun. 4, 2012, in the Korean Intellectual Property Office, the disclosure of which is incorporated herein by reference.

BACKGROUND OF THE INVENTION

1. Field of the Invention

The present invention relates to a conductive paste composition for an internal electrode, which is effective for controlling shrinkage, a multilayer ceramic capacitor having improved electrical characteristics, and a fabrication method thereof.

2. Description of the Related Art

Recently, as electronic products have been reduced in size, a multilayer ceramic electronic component has also required to be reduced in size, yet have a large capacity.

Thus, dielectric layers and internal electrodes have been attempted to be thinned and multi-layered according to various methods, and recently, multilayer ceramic electronic components having thinned dielectric layers while having a larger number of laminations have been fabricated.

Also, in order to thin internal electrodes, ceramic electronic components including inner electrodes formed by using a fine metal powder have been fabricated.

In particular, multilayer ceramic capacitors are fabricated by laminating hundreds of inner electrodes and dielectric layers or more.

In a fabrication process of a multilayer ceramic capacitor, a firing process is required to thermally heat a laminate to a temperature of up to 1200° C. in order to implement capacitor characteristics (in particular dielectric layers).

Here, internal electrode layers made of a metal may be greatly changed and deformed in volume due to a firing process, in comparison to dielectric layers made of a ceramic material.

In order to fabricate a multilayer ceramic capacitor having excellent electrical characteristics, it is necessary to control deformation of internal electrode layers. To this end, a technique of adding a base substance (or a sintering inhibitor, i.e., a ceramic material for delaying nickel powder shrinkage) to a conductive paste composition for an internal electrode, a technique of oxidation-coating nickel powder, or the like has been introduced.

Meanwhile, during a process of fabricating a multilayer ceramic capacitor, internal electrodes are required to undergo a debinder calcining process. Here, pure nickel particles are easily oxidized and expanded in volume, and strain acts on the internal electrodes during the process to potentially cause so-called oxidation cracks and result in a broken chip. Thus, in order to prevent oxidation cracks and to widen a process window, a method of using nickel particles coated with a nickel oxide has been introduced.

However, in the process of fabricating a multilayer ceramic capacitor using nickel particles coated with a nickel oxide, a high temperature reduction atmosphere thermal treatment for firing dielectrics is inevitably performed, even on the internal electrodes, and thus, shrinkage behavior of internal electrodes greatly affects electrical characteristics of the multilayer ceramic capacitor.

Namely, the internal electrodes (nickel) are reduced in volume and agglomerate during the foregoing process. This directly affects electrode connectivity and electrode coverage of the multilayer ceramic capacitor.

Also, during the reduction atmosphere thermal treatment, a nickel oxide constituting a coating layer of nickel is reduced to a nickel metal.

In general, a density of a nickel oxide is 6.67 $g/cm^3$ and that of a nickel metal is generally 8.90 $g/cm^3$.

Thus, as a nickel oxide layer is reduced to a nickel metal during reduction atmosphere firing, about 41% (over the content of a nickel oxide) of shrinkage occurs in addition to the shrinkage resulting from a sintering behavior.

In order to control sintering shrinkage of nickel particles, a base substance (or a sintering inhibitor, i.e., a ceramic material for delaying shrinkage of nickel powder) may be used. However, currently, there is no appropriate method of controlling shrinkage according to nickel oxide reduction.

In particular, as nickel particles are grain-refined, the volume parts of the nickel oxide in nickel particles are increasing, so the necessity of controlling shrinkage of conductive paste for an internal electrode is further increasing.

RELATED ART DOCUMENT (Patent Document 1) US Patent Laid Open Publication No. 20060171099
(Patent Document 2) US Patent Laid Open Publication No. 20070125195
(Patent Document 3) Japanese Patent Laid Open Publication No. 2009-24204

SUMMARY OF THE INVENTION

An aspect of the present invention provides a conductive paste composition for an internal electrode, which is effective for controlling shrinkage.

Another aspect of the present invention provides a method of fabricating a multilayer ceramic capacitor having an enhanced yield.

Another aspect of the present invention provides a multilayer ceramic capacitor having increased inner electrode connectivity and coverage and a fabrication method thereof.

Another aspect of the present invention provides a multilayer ceramic capacitor having enhanced electrical characteristics and a fabrication method thereof.

According to an aspect of the present invention, there is provided a conductive paste composition for an internal electrode, the conductive paste composition including: a binder; a solvent; and metal powder for an internal electrode, including a nickel particle coated with a nickel nitride.

The nickel particle may have an average particle diameter ranging from 50 to 400 nm.

The nickel nitride may include at least one of $Ni_3N$, $Ni_4N$, and $Ni_8N$.

A content of the nickel nitride may range from 0.5 to 5.0 parts by weight per 100 parts by weight of the metal powder.

A content of the nickel nitride may range from 1.5 to 2.5 parts by weight per 100 parts by weight of the metal powder.

According to another aspect of the present invention, there is provided a multilayer ceramic capacitor including: a ceramic body in which a plurality of dielectric layers are laminated; a plurality of internal electrodes formed on respective dielectric layers and formed with a conductive paste including a binder, a solvent, and metal powder for an internal electrode, including a nickel particle coated with a nickel nitride; and external electrodes electrically connected to the internal electrodes and formed on end surfaces of the ceramic body.

The nickel particle may have an average particle diameter ranging from 50 to 400 nm.

According to another aspect of the present invention, there is provided a multilayer ceramic capacitor including: a ceramic body in which an internal electrode and a dielectric layer are alternately laminated; and an external electrode electrically connected to the internal electrode and formed on an end surface of the ceramic body, wherein the multilayer ceramic capacitor includes 0.01 wt % or more of a nitride.

According to another aspect of the present invention, there is provided a method of fabricating a multilayer ceramic capacitor, the method including: preparing a plurality of ceramic green sheets; forming internal electrodes with a conductive paste including a binder, a solvent, and metal powder for an internal electrode, including a nickel particle coated with a nickel nitride, on the ceramic green sheets; laminating the ceramic green sheets having the internal electrodes formed thereon to form a laminate; and sintering the laminate.

The nickel particle may have an average particle diameter ranging from 50 to 400 nm.

The nickel nitride may include at least one of $Ni_3N$, $Ni_4N$, and $Ni_8N$.

A content of the nickel nitride may range from 0.5 to 5.0 parts by weight per 100 parts by weight of the metal powder.

A content of the nickel nitride may range from 1.5 to 2.5 parts by weight per 100 parts by weight of the metal powder.

BRIEF DESCRIPTION OF THE DRAWINGS

The above and other aspects, features and advantages of the present invention will be more clearly understood from the following detailed description taken in conjunction with the accompanying drawings, in which:

FIG. 4 is a view showing a process of fabricating a multilayer ceramic capacitor according to an embodiment of the present invention.

DETAILED DESCRIPTION OF THE PREFERRED EMBODIMENT

Figure 1:
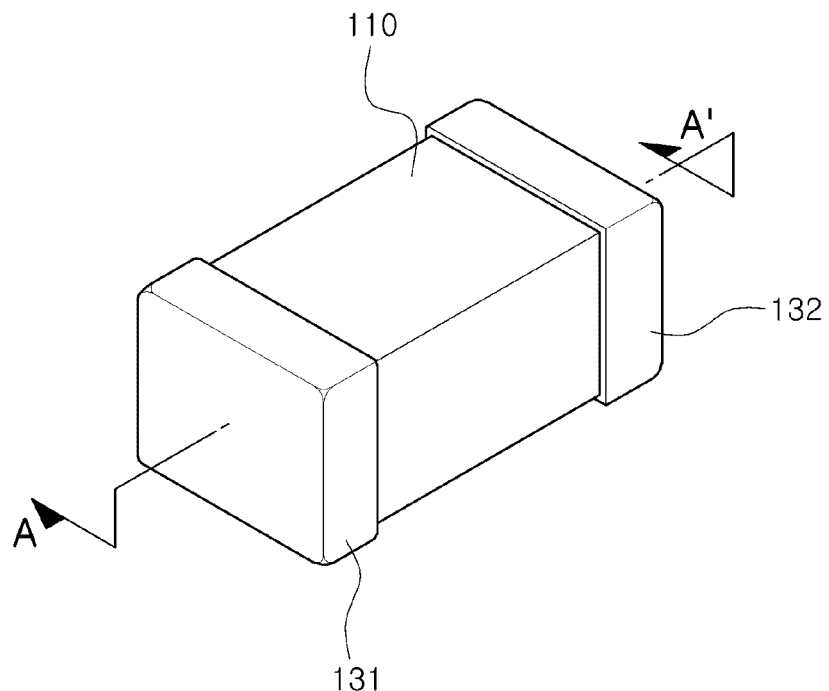
FIG. 1 is a schematic perspective view of a multilayer ceramic capacitor according to an embodiment of the present invention.

It is to be noted that technical terms used in the specification are used for describing specific exemplary embodiments and do not limit the present invention. In addition, unless indicated otherwise in the specification, it is to be understood that all the technical terms used in the specification are construed as having meanings generally understood by those skilled in the art and are not to be construed as having excessively comprehensive meanings and excessively reduced meanings. In addition, when the technical terms used in the specification are deemed to be technical terms that do not accurately indicate the technical spirit of the present invention, it is to be understood that the terms are replaced with the technical terms understood by those skilled in the art. Further, the general terms used in the present invention must be understood according to the terms defined by the dictionary or the context and should not be understood as excessively reduced meanings.

In addition, singular forms used in the specification are intended to include plural forms unless the context clearly indicates otherwise. In the specification, it is to be noted that the terms "comprising" or "including', and the like, are not to be construed as necessarily including several components or several steps described in the specification and a part of the above components or steps may not be included or additional components or steps are construed as being further included.

Terms used in the specification, 'first', 'second', etc. can be used to describe various components, but the components are not to be construed as being limited to the terms. The terms are used to distinguish one component from another component. For example, the 'first' component may be named the 'second' component and the 'second' component may also be similarly named the 'first' component, without departing from the scope of the present invention.

Hereinafter, exemplary embodiments of the present invention will be described in more detail with reference to the accompanying drawings. The same reference numerals will be used to describe the same or like components, independent of the reference numerals and an overlapped description of the same components will be omitted.

Further, when it is determined that the detailed description of the known art related to the present invention may obscure the gist of the present invention, the detailed description thereof will be omitted. In addition, it is to be noted that the accompanying drawings are provided to easily understand the technical spirit of the present invention and the technical spirit of the present invention is not construed as being limited by the accompanying drawings.

FIG. 1 is a schematic perspective view of a multilayer ceramic capacitor according to an embodiment of the present invention.

Figure 2:
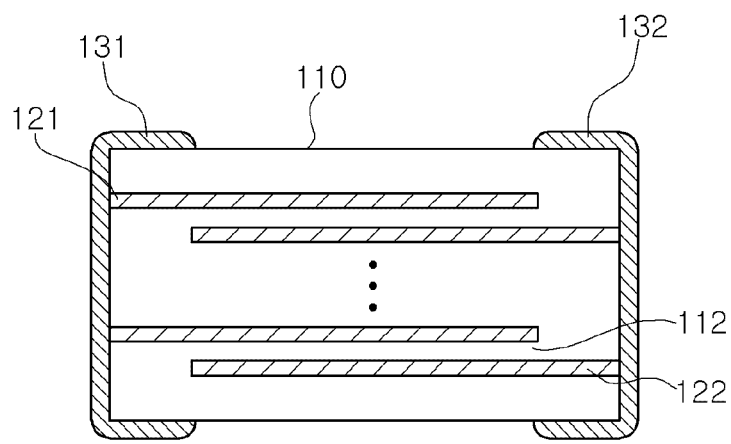
FIG. 2 is a schematic cross-sectional view of the multilayer ceramic capacitor of FIG. 1, taken along line A-A'.

FIG. 2 is a schematic cross-sectional view of the multilayer ceramic capacitor of FIG. 1, taken along line A-A'.

With reference to FIGS. 1 and 2, a multilayer ceramic capacitor according to the embodiment includes a ceramic body 110 in which a plurality of dielectric layers are laminated, a plurality of internal electrodes 121 and 122 formed on the dielectric layers, and external electrodes 131 and 132 formed on end surfaces of the ceramic body 110.

The ceramic body 110 may generally have a rectangular parallelepiped shape, but there is no particular limitation on the shape of the ceramic body 110. Also, dimensions of the ceramic body 110 are not particularly limited, but for example, the multilayer ceramic capacitor may have a size of, for example, 0.6 mm×0.3 mm and have a large amount of laminated layers and high capacity of 22.5 μF or more.

The ceramic body 110 may be formed by laminating a plurality of dielectric layers 112. The plurality of dielectric layers 112 constituting the ceramic body 110 are in a sintered state and adjacent dielectric layers 112 may be integrated such that boundaries therebetween may not be readily apparent.

Each dielectric layer 112 may be formed by sintering ceramic green sheets including ceramic powder.

Ceramic powder may not be particularly limited, as long as it is generally used in the art. For example, a $BaTiO_3$-based ceramic powder may be used, but the present invention is not limited thereto. The $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, obtained by partially employing Ca, Zr, or the like, in $BaTiO_3$, but the present invention is not limited thereto. An average particle diameter of the ceramic powder may be 1.0 μm or less, but the present invention is not limited thereto.

Also, the ceramic green sheet may include a transition metal oxide or carbide, a rare earth element, magnesium (Mg), aluminum (Al), or the like, together with ceramic powder.

A thickness of each dielectric layer 112 may be appropriately changed according to desired capacitance of the multilayer ceramic capacitor. For example, the thickness of each dielectric layer 112 may be 1.0 μm or less after a sintering operation is performed.

A plurality of the internal electrodes 121 and 122 may be formed within the ceramic body 110. The internal electrodes 121 and 122 may be formed on respective dielectric layers 112 and may be formed within the ceramic body 110, while having each dielectric layer 112 interposed therebetween through a sintering operation.

The internal electrodes 121 and 122 may be a pair of first internal electrode (reference numeral 121) and second internal electrode (reference numeral 122) having different polarities and may be disposed in an opposing manner in a direction in which the dielectric layers 112 are laminated. The distal ends of the first and second internal electrodes 121 and 122 may be alternately exposed to both end surfaces of the ceramic body 110, which are opposite to each other.

The thickness of the internal electrodes 121 and 122 may be appropriately determined according to the usage of the multilayer ceramic capacitor, or the like. For example, the thickness of the internal electrodes 121 and 122 may be 1.0 μm or less. The thickness of the internal electrodes 121 and 122 may be selected from within the range of 0.1 μm to 1.0 μm.

The internal electrodes 121 and 122 may be made of a conductive paste according to an embodiment of the present invention. For example, the internal electrodes 121 and 122 may be formed by printing a conductive paste on a ceramic green sheet and performing firing thereon. The printing method may include screen printing, gravure printing, and the like. The detailed matters thereof will be described hereinafter.

The external electrodes 131 and 132 may be formed on the end surfaces of the ceramic body 110 and electrically connected to the internal electrodes 121 and 122. In particular, the external electrodes 131 and 132 may include a first external electrode 131 electrically connected to the first internal electrode 121 exposed to one end surface of the ceramic body 110 and a second external electrode 132 electrically connected to the second internal electrode 122 exposed to the other end surface of the ceramic body 110.

The external electrodes 131 and 132 may be made of a conductive paste including a conductive material. As the conductive material included in the conductive paste, for example, nickel (Ni), copper (Cu), or alloys thereof may be used, but the present invention is not particularly limited thereto. The thickness of the external electrodes 131 and 132 may be appropriately determined according to a usage purpose, or the like.

A conductive paste composition for an internal electrode according to an embodiment of the present invention may include a binder, a solvent, and metal powder for an internal electrode, including a nickel particle coated with a nickel nitride.

Recently, dielectric layers and internal electrode layers have been required to be thinner, according to the trend for high-capacity multilayer ceramic capacitors, and thus, a fine-grained metal powder is used to fabricate a multilayer ceramic capacitor.

An average grain size of fine-grained metal powder is reduced to 120 nm or less, but in general, as the grain size of powder is reduced, heat resistance is degraded. Thus, metal powder having an average grain size below 120 nm, used in the process of fabricating a multilayer ceramic capacitor, to be inevitably subjected to a high temperature thermal treatment, is essentially required to be surface-coated.

This surface-coating layer has been formed mainly by using a nickel oxide.

However, since the smaller the grain size of powder is, the larger the volume of a coating layer in powder is, it is desirable to use a material having high density and heat resistance characteristics as a coating material.

Thus, in the embodiment, a multilayer ceramic capacitor is fabricated by using a nickel nitride having excellent density and heat resistance characteristics in comparison to a nickel oxide.

In general, a density of a nickel oxide is 6.67 g/cm$^3$ and that of a nickel metal is generally 8.90 g/cm$^3$.

Thus, during reduction atmosphere firing, a nickel oxide layer is reduced to a nickel metal, about 41% of shrinkage (over the content of a nickel oxide) occurs in addition of shrinkage due to a sintering behavior.

Meanwhile, when a nickel nitride is reduced to a nickel metal, volume reduction rates are 20.1% in case of Ni$_3$N (7.66 g/cm$^3$) and 17.0% in case of Ni$_4$N. For reference, at the time of a reduction reaction, in the case of an oxide, oxygen (O) is bonded with hydrogen (H) and removed in the form of moisture (H$_2$O) from the oxide, and in the case of a nitride, nitrogen (N) is bonded with hydrogen (H) and removed in the form of NH$_3$ from the nitride. The volume reduction rates are obtained by reflecting a density correction according to a phase change, atomic weights and compound forms of nickel, oxygen, and nitrogen.

In addition, since a size of required nickel particles is gradually reduced according to a reduction in the thickness of the internal electrodes, the volume of a surface coating layer is relatively increased in the nickel particles. Thus, it is important to select a material used to form the surface coating layer. In particular, in the case of powder having an average grain size of 100 nm or less, a volume percentage of a coating layer is 33 to 57 vol. % or greater, taking up a considerable amount of the volume of nickel power.

Figure 3:
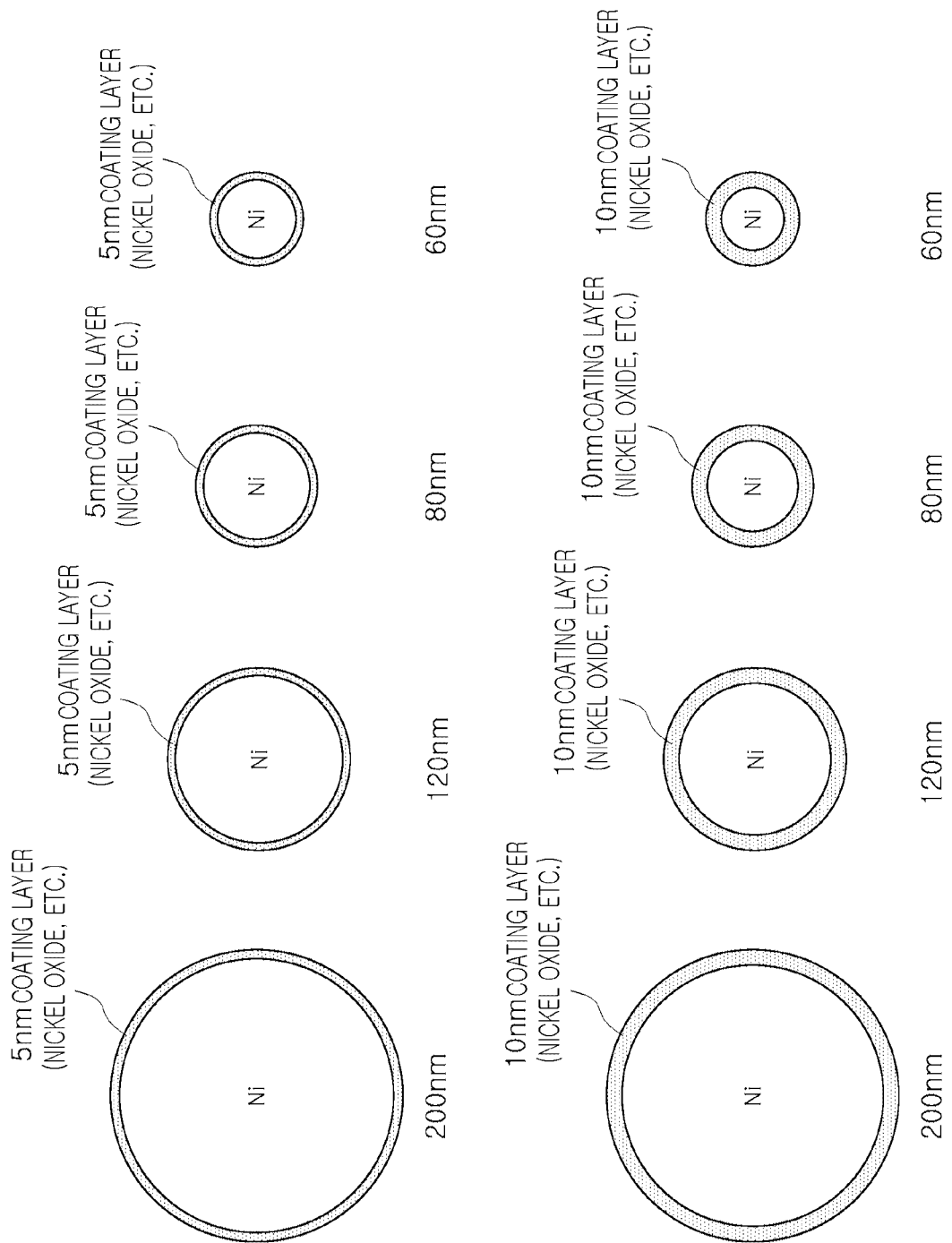
FIG. 3 is a schematic view showing surface-coating layers according to nickel particle sizes.

FIG. 3 is a schematic view showing surface coating layers according to nickel particle sizes.

As shown in FIG. 3, surface coating layers may be formed on nickel particles.

Table 1 and Table 2 show volume variation rates of coating layers over the overall volume of powder when metal powder using a nickel oxide and metal powder using a nickel nitride are applied to a nickel coating layer reduction process.

In particular, Table 1 shows volume variation rates of coating layers when a thickness of a coating layer is 10 nm with respect to a predetermined nickel powder (grain size: 200 nm, 120 nm, 80 nm, 60 nm).

Also, Table 2 shows volume variation rates of coating layers when a thickness of a coating layer is 5 nm with respect to a predetermined nickel powder (grain size: 200 nm, 120 nm, 80 nm, 60 nm).

TABLE 1

| | Grain size of nickel particle (nm) | | | |
|---|---|---|---|---|
| | 200 | 120 | 80 | 60 |
| Thickness of coating layer (nm) | 10 | 10 | 10 | 10 |
| Volume percentage of nickel particle (vol. %) | 72.9 | 57.9 | 42.2 | 29.6 |
| Volume percentage of coating layer (vol. %) | 27.1 | 42.1 | 57.8 | 70.4 |

TABLE 1-continued

|  | Grain size of nickel particle (nm) | | | |
| --- | --- | --- | --- | --- |
|  | 200 | 120 | 80 | 60 |
| Volume variation rate when coating layer is nickel oxide | −11.1 | −17.3 | −23.7 | −28.9 |
| Volume variation rate when coating layer is nickel nitride | −5.4 | −8.5 | −11.6 | −14.1 |

TABLE 2

|  | Grain size of nickel particle (nm) | | | |
| --- | --- | --- | --- | --- |
|  | 200 | 120 | 80 | 60 |
| Thickness of coating layer (nm) | 5 | 5 | 5 | 5 |
| Volume percentage of nickel particle (vol. %) | 85.7 | 77.0 | 67.0 | 57.9 |
| Volume percentage of coating layer (vol. %) | 14.3 | 23.0 | 33.0 | 42.1 |
| Volume variation rate when coating layer is nickel oxide | −5.8 | −9.4 | −13.5 | −17.3 |
| Volume variation rate when coating layer is nickel nitride | −2.9 | −4.6 | −6.6 | −8.5 |

With reference to Table 1 and Table 2, it can be seen that, in all cases, metal powder using a nickel nitride as a coating layer shrinks less than metal power using a nickel oxide as a coating layer.

Namely, the conductive paste composition for an internal electrode according to an embodiment of the present invention may have a significantly reduced shrinkage in comparison to a conductive paste composition for an internal electrode using a nickel oxide.

Thus, when a multilayer ceramic capacitor is fabricated by using the conductive paste composition for an internal electrode according to an embodiment of the present invention, shrinkage of internal electrodes in the multilayer ceramic capacitor may be lessened. Also, connectivity and coverage of the internal electrodes in the multilayer ceramic capacitor may be increased. Thus, electrical characteristics of the multilayer ceramic capacitor, such as capacity, a breakdown voltage (BDV), or the like, may be enhanced.

In addition, when a multilayer ceramic capacitor is fabricated by using the conductive paste composition for an internal electrode according to an embodiment of the present invention, a shrinkage difference between dielectric layers and internal electrodes may be reduced and strain applied to the capacitor may be reduced, enhancing a chip yield.

A nickel metal particle in which a coating layer is reduced to disappear during reduction atmosphere firing performed on a laminate is vulnerable to sintering shrinkage. Thus, a base substance smaller than the nickel particle may be used for controlling shrinkage in a high temperature range of 800° C. or higher.

Meanwhile, a nickel oxide coating layer may affect shrinkage control in a temperature range from 300° C. to 600° C. However, the nickel oxide coating layer is reduced under an atmosphere including $H_2$ at a temperature of 250° C. or higher, and an oxide layer disappears gradually, so the nickel oxide coating layer may not actually affect controlling shrinkage in a temperature region higher than 600° C. The specified temperature range may differ according to a corresponding $H_2$ partial pressure.

Meanwhile, in the case of the nickel nitride coating layer, since $N_2$ of 90 vol % or more is used as a back ground gas to control a firing atmosphere in actuality, an $N_2$ partial pressure is so high that it can exist even at a high temperature during firing in comparison to an oxide. Namely, since the nickel nitride coating layer may affect shrinkage control even to a relatively high temperature.

Meanwhile, an average particle diameter of the metal powder is not particularly limited, but preferably, it ranges from 50 to 400 nm.

Also, types of a nickel nitride are not particularly limited, but preferably, may be $Ni_3N$, $Ni_4N$, or $Ni_8N$.

Also, preferably, the content of a nickel nitride is 0.5 to 5.0 parts by weight per 100 parts by weight of the metal powder.

More preferably, the content of the nickel nitride may be 1.5 to 2.5 parts by weight per 100 parts by weight of the metal powder.

FIG. 4 is a view showing a process of fabricating a multilayer ceramic capacitor.

With reference to FIG. 4, a method of fabricating a multilayer ceramic capacitor according to an embodiment of the present invention may include preparing a plurality of ceramic green sheets; forming internal electrodes with a conductive paste composition including a binder, a solvent, and metal powder for an internal electrode including a nickel particle coated with a nickel nitride, on the ceramic green sheets; laminating the ceramic green sheets having the internal electrodes formed thereon to form a laminate; and sintering the laminate.

First, a conductive paste including a binder, a solvent, and metal powder for an internal electrode including a nickel particle coated with a nickel nitride may be provided.

Thereafter, a multilayer ceramic capacitor may be fabricated by using the conductive paste.

First, a plurality of green sheets are prepared (FIG. 4A). The green sheets are ceramic green sheets and may form dielectric layers 112 each having a thickness of a few micrometers (μm) by combining powder such as barium titanate ($BaTiO_3$) powder, or the like, with a ceramic additive, an organic solvent, a plasticizer, a binder, and a dispersing agent.

The internal electrode layers 121 and 122 may be formed of the conductive paste on the green sheets (FIG. 4B).

After the internal electrode layers 121 and 122 are formed, the green sheets are separated from carrier films, and the plurality of green sheets are laminated in an overlapping manner to form a laminate (FIG. 4C).

Subsequently, the laminate is compressed at a high temperature and high pressure (FIG. 4D), and then, the compressed laminate is cut to a certain size through a cutting process (FIG. 4E) to form a green chip (FIG. 4F).

Thereafter, the laminate formed as a chip is fired, for example, at about 1200° C., for example, to fabricate a ceramic body.

Then, first and second external electrodes may be formed such that they are electrically connected to the first and second internal electrodes exposed to the end surfaces of the ceramic body. Thereafter, the surfaces of the external electrodes are plated with nickel, tin, or the like.

Meanwhile, the multilayer ceramic capacitor fabricated according to the method of fabricating a multilayer ceramic capacitor according to an embodiment of the present invention may include at least 0.01 wt % of a nitride. For example, the multilayer ceramic capacitor fabricated by using the metal powder for an internal electrode including 0.5 to 7.0 wt % of a nickel nitride may include at least 0.01 wt % of a nitride.

Example

The present invention will be described in more detail through an Example, but the Example is merely to help in specifically understanding the present invention, and the scope of the present invention is not limited thereto.

The present Example shows the results of experimentation with respect to a multilayer ceramic capacitor fabricated by using nickel powder having an average grain size of 120 nm, in which a nickel nitride occupies 0 to 7 parts by weight per 100 parts by weight of nickel.

Table 3 shows calcination crack generation rates according to coating amount (wt %) of a nickel nitride and electrode connectivity.

TABLE 3

| Sample No. | Nitrogen (wt %) | Calcination crack | Electrode connectivity |
|---|---|---|---|
| 1 | 0 | X | X |
| 2 | 0.5 | Δ | ○ |
| 3 | 1.5 | ○ | ⊚ |
| 4 | 2.0 | ⊚ | ⊚ |
| 5 | 2.5 | ⊚ | ⊚ |
| 6 | 3.0 | ⊚ | ○ |
| 7 | 4.0 | ⊚ | ○ |
| 8 | 5.0 | ⊚ | ○ |
| 9 | 6.0 | ⊚ | Δ |
| 10 | 7.0 | ⊚ | Δ |

In relation to calcination cracking, x indicates a poor state, Δ indicates the case in which selection is required, ○ indicates a good case, and ⊚ indicates an excellent case.

In relation to electrode connectivity, x indicates the case of a poor state (electrode connectivity of 75% or less), Δ indicates the case in which selection is required (electrode connectivity ranging from 75 to 80%), ○ indicates a good case (electrode connectivity ranging from 80 to 85%), and ⊚ indicates an excellent case (electrode connectivity greater than 85%).

A corresponding sample can be applied in a fabrication process when it has the electrode connectivity of at least 80% or more.

With reference to Table 3, sample 1 (metal powder whose surface was not coated with an oxide nitride) had calcination cracks (oxidation cracks) during a debinding process. Also, sample 1 had defective electrode connectivity. Thus, sample 1 cannot be applied to a fabrication process.

Samples 2 to 8 (metal powder whose surface was coated with an oxide nitride coating layer having a certain thickness or greater) were less affected by a thermal treatment during calcining and firing operation, having stable electrode connectivity and implementing a stable multilayer ceramic capacitor (MLCC) capacity.

Meanwhile, more preferably, metal powder having a coating layer formed thereon at a rate (1.5 to 2.5 wt %) of a nitride defined in the samples 3 to 5 may be applied to a fabrication process. When the metal powder based on this rate is used, the electrode connectivity is stable to the maximum level. Also, in this case, a stable MLCC capacity can be implemented. In this case, the method of fabricating an MLCC can provide a maximum yield.

Meanwhile, in the case of samples 9 and 10 (metal powder having an excessive content of nitrogen), since the percentage of nickel is reduced, connectivity is degraded. In this case, however, a rate of change in volume can be controlled to a degree, in comparison to a sample experiencing a rapid change in volume due to a weak coating layer.

As set forth above, according to embodiments of the invention, the foregoing defects of the related art can be solved.

In particular, the conductive paste composition for an internal electrode, effective for controlling shrinkage, can be provided to users.

Also, a method of fabricating a multilayer ceramic capacitor having an enhanced yield can be provided.

Also, a multilayer ceramic capacitor having increased connectivity and coverage of internal electrodes and a fabrication method thereof can be provided to users.

Also, a multilayer ceramic capacitor having enhanced electrical characteristics and a fabrication method thereof can be provided to users.

While the present invention has been shown and described in connection with the embodiments, it will be apparent to those skilled in the art that modifications and variations can be made without departing from the spirit and scope of the invention as defined by the appended claims.

What is claimed is:

1. A conductive paste composition for an internal electrode, the conductive paste composition comprising:
    a binder;
    a solvent; and
    metal powder for an internal electrode, including a nickel particle coated with a nickel nitride,
    wherein a content of the nickel nitride ranges from 0.5 to 5.0 parts by weight per 100 parts by weight of the metal powder.

2. The conductive paste composition of claim 1, wherein the nickel particle has an average particle diameter ranging from 50 to 400 nm.

3. The conductive paste composition of claim 1, wherein the nickel nitride includes at least one of $Ni_3N$, $Ni_4N$, and $Ni_8N$.

4. The conductive paste composition of claim 1, wherein a content of the nickel nitride ranges from 1.5 to 2.5 parts by weight per 100 parts by weight of the metal powder.

5. A multilayer ceramic capacitor comprising:
    a ceramic body in which a plurality of dielectric layers are laminated;
    a plurality of internal electrodes formed on respective dielectric layers and formed with a conductive paste including a binder, a solvent, and metal powder for an internal electrode, including a nickel particle coated with a nickel nitride; and
    external electrodes electrically connected to the internal electrodes and formed on end surfaces of the ceramic body,
    wherein a content of the nickel nitride ranges from 0.5 to 5.0 parts by weight per 100 parts by weight of the metal powder.

6. The multilayer ceramic capacitor of claim 5, wherein the nickel particle has an average particle diameter ranging from 50 to 400 nm.

7. A multilayer ceramic capacitor comprising:
    a ceramic body in which an internal electrode and a dielectric layer are alternately laminated; and
    an external electrode electrically connected to the internal electrode and formed on an end surface of the ceramic body,
    wherein the multilayer ceramic capacitor includes 0.01 wt % or more of a nickel nitride.

8. A method of fabricating a multilayer ceramic capacitor, the method comprising:
    preparing a plurality of ceramic green sheets;
    forming internal electrodes with a conductive paste including a binder, a solvent, and metal powder for an internal electrode, including a nickel particle coated with a nickel nitride, on the ceramic green sheets;

laminating the ceramic green sheets having the internal electrodes formed thereon to form a laminate; and
sintering the laminate,
wherein a content of the nickel nitride ranges from 0.5 to 5.0 parts by weight per 100 parts by weight of the metal powder.

9. The method of claim 8, wherein the nickel particle has an average particle diameter ranging from 50 to 400 nm.

10. The method of claim 8, wherein the nickel nitride includes at least one of $Ni_3N$, $Ni_4N$, and $Ni_8N$.

11. The method of claim 8, wherein a content of the nickel nitride ranges from 1.5 to 2.5 parts by weight per 100 parts by weight of the metal powder.

* * * * *